United States Patent [19]

Koo

[11] Patent Number: 5,940,070
[45] Date of Patent: Aug. 17, 1999

[54] DEVICE AND METHOD FOR TRANSMITTING AN AUDIO SIGNAL USING A VIDEO SIGNAL LINE IN A COMPUTER SYSTEM

[75] Inventor: Ja-goun Koo, Seoul, Rep. of Korea

[73] Assignee: SamSung Electronics Co., Ltd., Kyungki-do, Rep. of Korea

[21] Appl. No.: 08/645,168

[22] Filed: May 13, 1996

[30] Foreign Application Priority Data

May 12, 1995 [KR] Rep. of Korea ................. 95/11720

[51] Int. Cl.[6] .............................. G06F 13/14; H04N 7/08
[52] U.S. Cl. ........................................ 345/302; 348/482
[58] Field of Search .................... 345/115, 302, 345/978, 418, 2; 348/476–480, 484, 489, 515, 482, 232, 423, 462; 386/96

[56] References Cited

U.S. PATENT DOCUMENTS

| | | |
|---|---|---|
| 3,423,520 | 1/1969 | Kelly . |
| 3,902,007 | 8/1975 | Justice . |
| 4,191,969 | 3/1980 | Briand et al. . |
| 4,296,476 | 10/1981 | Mayer et al. ........................ 345/418 |
| 4,847,698 | 7/1989 | Freeman . |
| 4,849,811 | 7/1989 | Kleinerman ........................ 348/423 |
| 4,983,967 | 1/1991 | KcKenzie . |
| 5,091,936 | 2/1992 | Katznelson et al. . |
| 5,117,225 | 5/1992 | Wang ................................. 345/2 |
| 5,150,211 | 9/1992 | Charbonne et al. . |
| 5,202,886 | 4/1993 | Rossi et al. . |
| 5,231,492 | 7/1993 | Dangi et al. ........................ 348/484 |
| 5,351,090 | 9/1994 | Nakamura . |
| 5,524,194 | 6/1996 | Chida et al. ........................ 348/232 |
| 5,526,354 | 6/1996 | Barraclough et al. ................ 345/2 |
| 5,642,171 | 6/1997 | Baumgartner et al. .............. 345/302 |
| 5,751,338 | 5/1998 | Ludwig, Jr. ......................... 345/2 |

Primary Examiner—Jeffery Brier
Assistant Examiner—Paul A. Bell
Attorney, Agent, or Firm—Robert E. Bushnell, Esq.

[57] ABSTRACT

A data transmission apparatus for transmitting an audio signal through a video signal cable for a computer system including a monitor having a sound speaker. The computer system includes an audio generating device for generating an audio signal; a video generating device for generating a video signal and synchronization signals, a first audio buffer for temporary retaining the audio signal and outputting the audio signal during a blanking interval of the video signal in accordance with the synchronization signals; and a multiplexer for multiplexing the audio signal with the video signal by inserting the audio signal into the blanking interval of the video signal and for generating a multiplexed signal. A video signal cable is connected between the computer system and the monitor for transmitting the multiplexed signal from the computer system to the monitor. The monitor includes a demultiplexer connected to the video signal cable, for demultiplexing the multiplexed signal received from the video signal cable by separating the audio signal and the video signal from the multiplexed signal in accordance with a control signal and for generating a separated audio signal and a separated video signal; a second audio buffer for temporarily retaining the separated audio signal and outputting the separated audio signal to the sound speaker for sound production in accordance with the control signal and the synchronization signals; and a video display for simultaneously enabling a visual display of the separated video signal on a screen in accordance with the synchronization signals. The data transmission apparatus constructed according the principles of the present invention seeks to advantageously transmit the audio signal to the monitor for sound reproduction without requiring a separable audio cable.

19 Claims, 4 Drawing Sheets

DEVICE AND METHOD FOR TRANSMITTING AN AUDIO SIGNAL USING A VIDEO SIGNAL LINE IN A COMPUTER SYSTEM

CROSS-REFERENCE TO RELATED APPLICATION

This application makes reference to, incorporates the same herein, and claims all benefits accruing under 35 U.S.C. §119 from an application for Device And Method For Transmitting Audio Signal Using A Video Signal Line earlier filed in the Korean Industrial Property Office on May 12 1995, and there duly assigned Ser. No. 11720/1995.

BACKGROUND OF THE INVENTION

1. Technical Field

The present invention relates to a transmission device and method for transmitting an audio signal through a video signal line. In particular, the present invention relates to a transmission device and method using red (R), green (G), and blue (B) video signal lines of a video graphics array (VGA) in a computer having a VGA color monitor.

2. Background Art

Generally, a monitor is a peripheral device which processes information data received from an information data system such as a computer system and provides a visual display of processed information data on a screen. Such a monitor is typically available in either black and white known as monochrome monitor or high resolution color known as color graphics adapter (CGA), video graphics adapter (VGA) and enhanced graphics adapter VEGA) monitor. Monochrome, CGA, EGA monitors provide a visual display of graphics data by processing digital signals. VGA monitors, by contrast, provide a visual display of graphics data by processing analog signals. The information data received from a computer system for a visual display comes in two different types of signals, a video signal format and an audio signal format. There are known signal transmission techniques for a broadcasting station in which an audio signal is transmitted during a non-video portion of a video signal such as disclosed, for example, in U.S. Pat. No. 3,423,520 for Time Division Multiplexing Of Audio And Video Signals issued to Kelly, U.S. Pat. No. 3,902,007 for Audio And Video Plural Source Time Division Multiplex For An Educational TV System issued to Justice, U.S. Pat. No. 4,983,967 for Transmission Of Audio In A Video Signal issued to McKenzie, U.S. Pat. No. 5,150,211 for Method And System For Multiplexing Audio And Video Signals To Distribute Still Pictures With Accompanying Sound issued to Charbonnel et al., and U.S. Pat. No. 5,351,090 for Video And Audio Signal Multiplexing Apparatus And Separating Apparatus issued to Nakamura. None however relates to the cable transmission of audio and video signals between a computer system and a monitor for audio and video production.

In a conventional computer system, the video signal is typically transmitted to a monitor in accordance with horizontal and vertical synchronization signals for a visual display. The audio signal which is output from a sound card or a CD-ROM (compact disk read only memory) mounted in the computer system, on the other hand, is transmitted not to the monitor but through an audio signal processing unit mounted internally or externally to the computer system through a separate audio cable. That is, the conventional transmission of an audio signal and a video signal in a computer system requires two separate transmission cables for audio and video generation on a monitor.

SUMMARY OF THE INVENTION

Accordingly, it is therefore an object of the present invention to provide a data transmission apparatus for a computer system including a monitor for transmitting an audio signal through a transmission line of a video signal.

It is also an object to provide a data transmission apparatus for a computer system including a VGA color monitor for multiplexing an audio signal received from a sound card with a video signal received from a video card on a time shared basis and for transmitting a multiplexed signal via a single transmission line to a VGA color monitor having a speaker.

To achieve these and other objects, the present invention contemplates a data transmission apparatus for transmitting an audio signal through a video signal cable for a computer system including a monitor having a sound speaker. The computer system includes an audio generating device for generating an audio signal; a video generating device for generating a video signal and synchronization signals, a first audio buffer for temporary retaining the audio signal and outputting the audio signal during a blanking interval of the video signal in accordance with the synchronization signals; and a multiplexer for multiplexing the audio signal with the video signal by inserting the audio signal into the blanking interval of the video signal and for generating a multiplexed signal. A video signal cable is connected between the computer system and the monitor for transmitting the multiplexed signal from the computer system to the monitor. The monitor includes a demultiplexer connected to the video signal cable, for demultiplexing the multiplexed signal received from the video signal cable by separating the audio signal and the video signal from the multiplexed signal in accordance with a control signal and for generating a separated audio signal and a separated video signal; a second audio buffer for temporarily retaining the separated audio signal and outputting the separated audio signal to the sound speaker for sound production in accordance with the control signal and the synchronization signals; and a video display for enabling a visual display of the separated video signal on a screen in accordance with the synchronization signals. The data transmission apparatus constructed according the principles of the present invention seeks to advantageously transmit the audio signal to the monitor for sound reproduction without requiring a separable audio cable.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED OF THE PREFERRED EMBODIMENT

Figure 1:
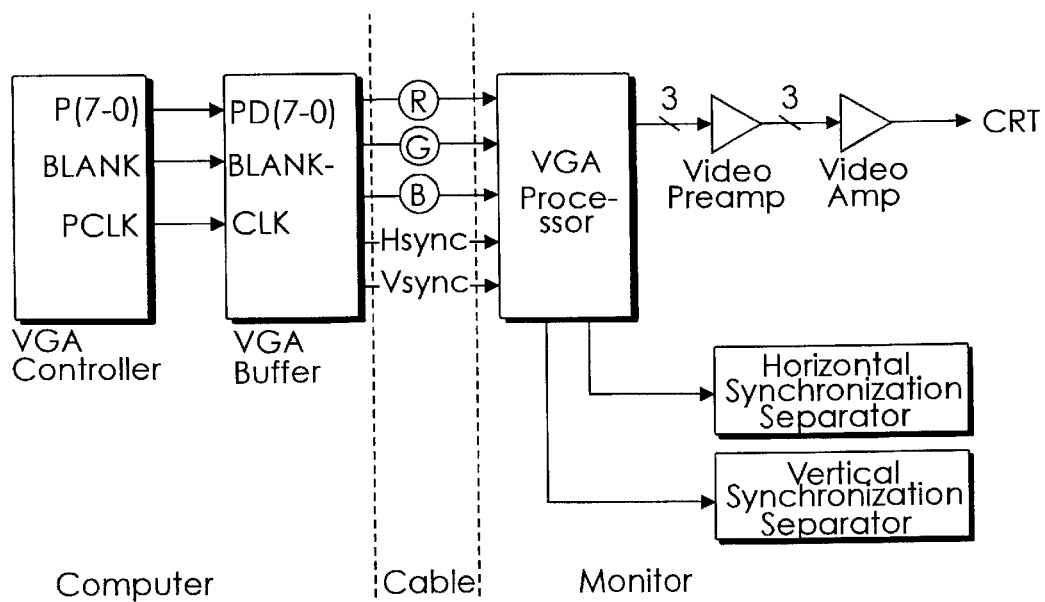
FIG. 1 illustrates a conventional arrangement of a computer system connected to a monitor by way of a video cable.

Referring now to the drawings and particularly to FIG. 1, which illustrates a conventional arrangement of a computer system connected to a monitor by way of a video cable. As shown in FIG. 1, a monitor used is typically a VGA color monitor connected to a computer system by way of a video cable for displaying only graphics data on a screen after processing an input video signal. The computer system includes a VGA controller 1 for controlling a VGA buffer 2 to generate a video signal in three different color lines including red (R), green (G) and blue (B) along with a horizontal synchronization and a vertical synchronization signal via a video cable. The monitor includes a VGA processor 3 for processing the video signal received from the video cable for a visual display on a cathode-ray tube (CRT) through a video preamplifier 6 and a video amplifier 7. A horizontal synchronization separator 4 and a vertical synchronization separator 5 are relied upon to adjust the picture display on the CRT.

Figure 2A:
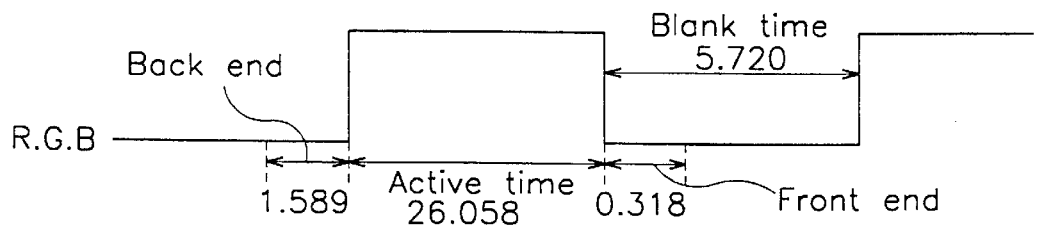
FIG. 2A illustrates a conventional waveform diagram of a video signal output in accordance with a horizontal synchronization signal of FIG. 2B.
Figure 2B:
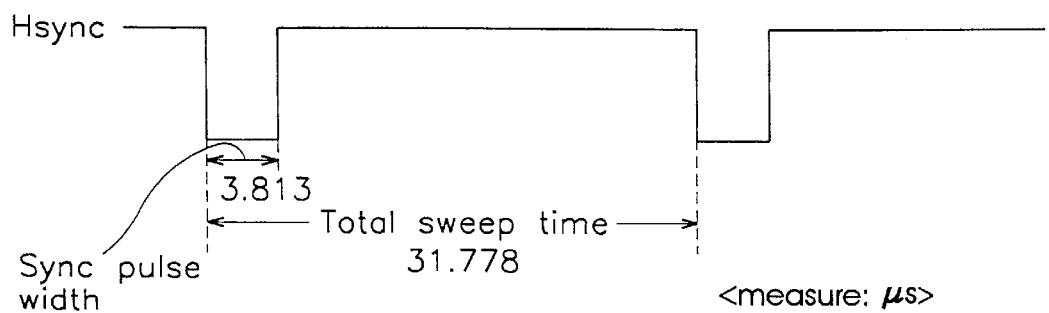
Figure 3A:
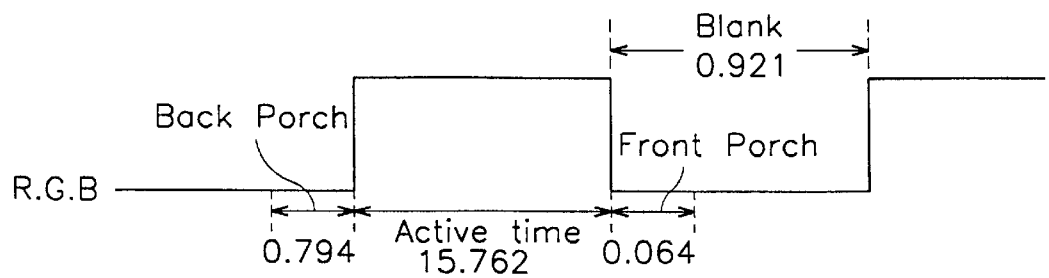
FIG. 3A illustrates a conventional waveform diagram of a video signal output in accordance with a vertical synchronization signal of FIG. 3B.
Figure 3B:
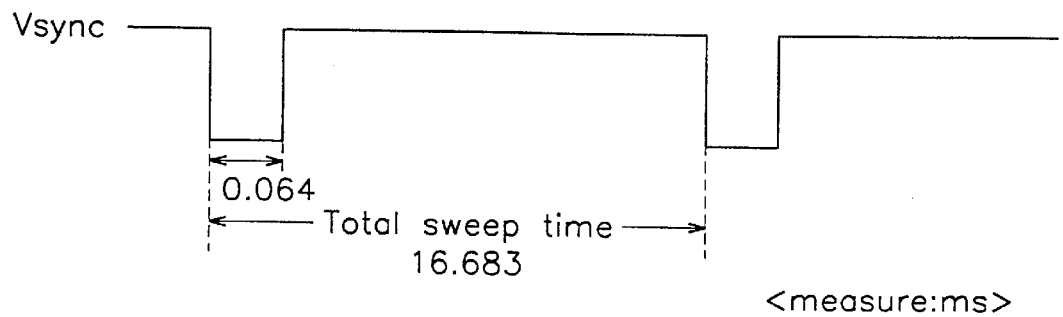

FIGS. 2A and 3A illustrate a conventional waveform diagram of a video signal output in accordance with a horizontal synchronization signal of FIG. 2B and a vertical synchronization signal of FIG. 3B, respectively. As shown in FIGS. 2A to 3B, a video signal is transmitted to a monitor according to horizontal and vertical synchronization signals. Since the conventional VGA color monitor displays only graphics data, the audio signal which is generated from a sound card or a CD-ROM (compact disk read only memory) mounted to a computer system is output through an audio signal processing unit mounted either internal or external to the computer system by a separate audio cable. That is, as described previously a separate audio cable is required for the computer system to transmit an audio signal output from a sound card to the monitor having either a built-in or a detachable speaker for sound generation.

Figure 4:
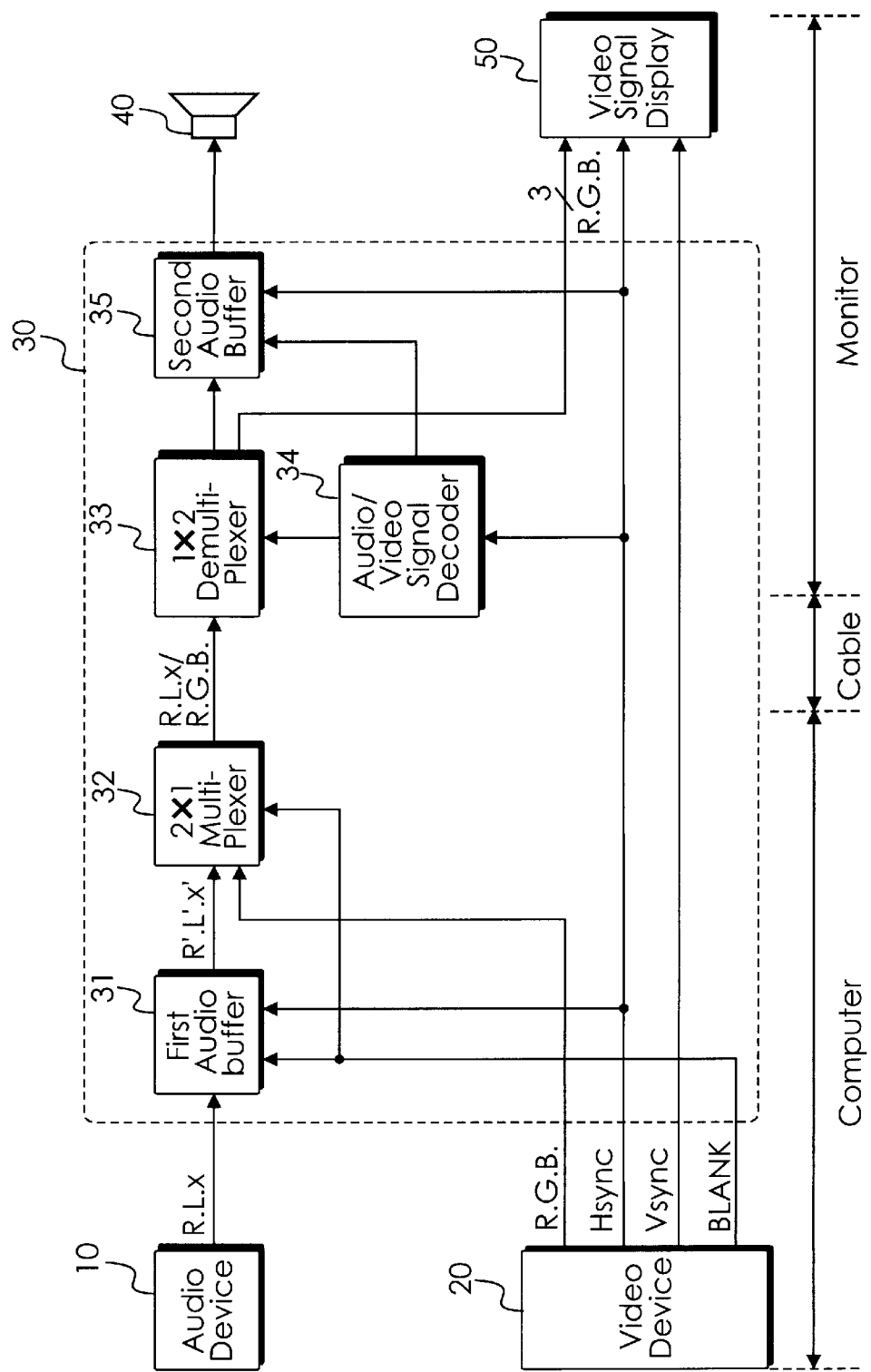
FIG. 4 is a schematic block diagram of a data transmission apparatus for a computer system including a monitor for transmitting an audio signal through a video signal line in accordance with a first embodiment of the present invention.

Turning now to FIG. 4 which illustrates a data transmission apparatus for a computer system including a monitor for transmitting an audio signal through a video signal line in accordance with a first embodiment of the present invention. As shown in FIG. 4, the data transmission apparatus of the present invention includes an audio device 10 having a CD-ROM or a sound card for generating an audio signal, and a video device 20 such as a video card for generating a video signal including red (R), green (G) and blue (B) video components and for activating a blank interval when the red (R), green (G) and blue (B) video components, horizontal synchronization and vertical synchronization signals are not generated. A signal division output device 30 is connected to the audio device 10 and the video device 20 for outputting the video signal when the blank interval is not activated, and alternately outputting the audio signal when the blank interval is activated. A video signal display 50 is connected to the signal division output device 30 for processing and scanning on a screen the video signal output from the signal division output device 30. An audio signal output device 40 such as a speaker is also connected to the signal division output device 30 for processing and generating audible sound corresponding to the audio signal output from the signal division output device 30.

The signal division output device 30 as constructed according to the principles of the present invention includes a first audio buffer 31 for temporarily storing the audio signal output from the audio device 10 and for outputting the stored audio signal in response to activation of a blank signal generated from the video device 20; and a multiplexer 32 for multiplexing the audio signal from the first audio buffer 31 with the video signal from the video device 30 by inserting the audio signal into the video signal during the blank interval and for outputting a multiplexed signal representing a composite audio and video signal through a video line of a video cable. An audio/video signal decoder 34 is connected to the video cable to receive the horizontal synchronization signal generated from the video device 20 for generating a control signal for controlling the separation of the audio and video components of the multiplexed signal. A demultiplexer 33 is connected to the video cable to receive the multiplexed signal transmitted from the multiplexer 32 for separating the audio signal and the video signal from the multiplexed signal according to control signal generated from the audio/video signal decoder 34. A second audio buffer 35 is connected to the demultiplexer 33 for temporarily storing the audio signal separated from the demultiplexer 33 and for outputting the stored audio signal to the audio signal output device 40 according to the control signal generated from the audio/video signal decoder 34 and the horizontal synchronization signal received from the video cable. A video signal display 50 is then connected to process and scan on a screen the video signal output from the demultiplexer 33 according to the horizontal and vertical synchronization signals generated from the video device 20 by way of the video cable.

Figure 5A:
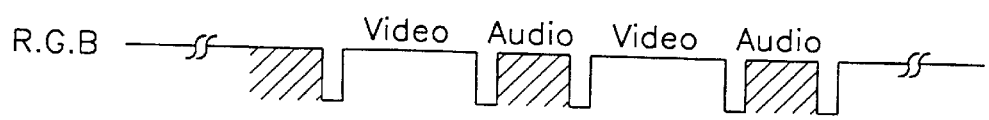
FIG. 5A illustrates a waveform diagram of an audio signal output in accordance with a horizontal synchronization signal of FIG. 5B according to the first embodiment of the present invention.
Figure 5B:

FIG. 5A illustrates a waveform diagram of an audio signal output in accordance with a horizontal synchronization signal of FIG. 5B according to the first embodiment of the present invention.

The operation of the first embodiment of the present invention as shown in FIG. 4 is now described with reference to FIGS. 2A and 2B, FIGS. 3A and 3B, and FIGS. 5A and 5B as follows.

The timing diagram of each video signal line for transmitting graphics data to the monitor is shown in FIG. 2A. Each numerical value of the timing diagram is different according to the VGA mode, and is described with reference of the signal division output device 30 of the first embodiment as shown in FIG. 4.

When the horizontal synchronization signal of FIG. 2B is used as a reference signal, the time period of the horizontal synchronization signal is 31.778 µs, the activated time period of the video signal is 26.058 µs, and the blank time period (that is, non-activated time) is 5.720 µs.

The following table describes the active and blank time period of the horizontal synchronization signal according to different VGA modes.

TABLE

Measure: μs

| MODE | ACTIVE | BLANKING | TOTAL SWEEP |
|------|--------|----------|-------------|
| VGA1 | 26.058 | 5.720 | 31.778 |
| VGA2 | 26.058 | 5.720 | 31.778 |
| VGA3 | 26.058 | 5.720 | 31.778 |
| SVGA | 22.222 | 6.222 | 28.444 |
| 8514/A | 22.803 | 5.348 | 28.153 |

Eighteen to nineteen percent of the bandwidth of the total sweep time is used with the blank time period as shown in TABLE 1. Therefore, the analog channel during the blank time of eighteen to nineteen percent, except the active time of eighty one to eighty two percent, is used with the bandwidth for audio signal in the red R), green (G), blue (B) video signal line of a computer system using a VGA color monitor.

As established above, the audio device 10 according to the first embodiment of the present invention as shown in FIG. 4 includes a sound card or a CD-ROM used in a general computer system. The video device 20 outputs R, G, B video signals according to the image to be displayed on a video signal display 50, and horizontal and vertical synchronization signals. The left (L) and right (R) signals of a main audio signal and a sub audio signal x supplied from the audio device 10 are stored in the first audio buffer 31. The first audio buffer 31 is used to temporarily store the audio signal for a delayed period corresponding to the time where the video signal is generated by the video device 20.

The R, G, B video signal output from the video device 20 is input into the multiplexer 32. When the R, G, B video signal is output from the video device 20, the blank interval is not activated. When the blank interval is activated and is provided to the first audio buffer 31 and the multiplexer 32 however, the R, G, B video signal is not output from the video device 20.

When the blank interval is activated and supplied to the first audio buffer 31, the stored audio signal is output to the multiplexer 32. The multiplexer 32 selects and outputs the video signal when the video signal is input, and selects and outputs the audio signal without selecting the video signal line when the audio signal is output from the first audio buffer 31.

Since the multiplexer 32 includes a 2×1 multiplexer (e.g. analog switch), the video signal is selected and output when the blank interval is not activated. When the blank interval is activated however, only the audio signal is selected and transmitted through the same video line that the video signal is transmitted when the video signal is not output in accordance with a horizontal synchronization signal as shown in FIG. 5B. The multiplexed signal output from the multiplexer 32 is shown in FIG. 5A.

The following is the operation truth table for the multiplexer 32.

| blank signal | multiplexer output signal |
|--------------|---------------------------|
| inactive | image signal (R, G, B) |
| active | video signal (R, L, x) |

The multiplexed signal output from the multiplexer 32 is input into the demultiplexer 33. The audio/video signal decoder 34 generates a control signal in response to the horizontal synchronization signal generated from the video device 20. The control signal is used by the demultiplexer 33 to separate the audio signal and the video signal from the multiplexed signal received through the video line of the video cable.

The demultiplexer 33 separates the audio signal and the video signal from the multiplexed signal received through the video line of a video cable according to the control signal generated from the audio/video signal decoder 34. The video signal separated from the multiplexed signal by the demultiplexer 33 is output to the video signal display 50 for a visual display of a video image. The audio signal separated from the multiplexed signal by the demultiplexer 33, on the other hand, is output to the second audio buffer 35 where a time axis correction is performed so that both the video signal and the audio signal are reproduced simultaneously. The demultiplexer 33 as contemplated by the first embodiment of the present invention is a 1×2 analog demultiplexer.

The following is the operation truth table of the demultiplexer 33, and is contrary with that of the multiplexer 32.

| control signal | demultiplexer output signal |
|----------------|-----------------------------|
| inactive | video signal (R, L, x) |
| active | image signal (R, G, B) |

The second audio buffer 35 executes a function that is complementary of the first audio buffer 31, when the audio signal output from the demultiplexer 33 is transmitted to the audio signal output device 40.

The frequency may be modulated with the time calculated according to the following equation and transmitted, in order to transmit the audio signal for t seconds generated from the audio device 10 through the video cable between the computer system and the VGA color monitor, that is, the video cable connected between the multiplexer 32 and the demultiplexer 35.

$$t \times \frac{\text{blank time}}{\text{total sweep time}} \approx t \times 19\%$$

The second audio buffer 35 stores and outputs to the audio signal output device 4 the audio signal output from the demultiplexer 33 so as to generate the frequency modulation for the above time. The video signal display 50 processes and scans on the screen of the monitor the input video signal.

Figure 6:
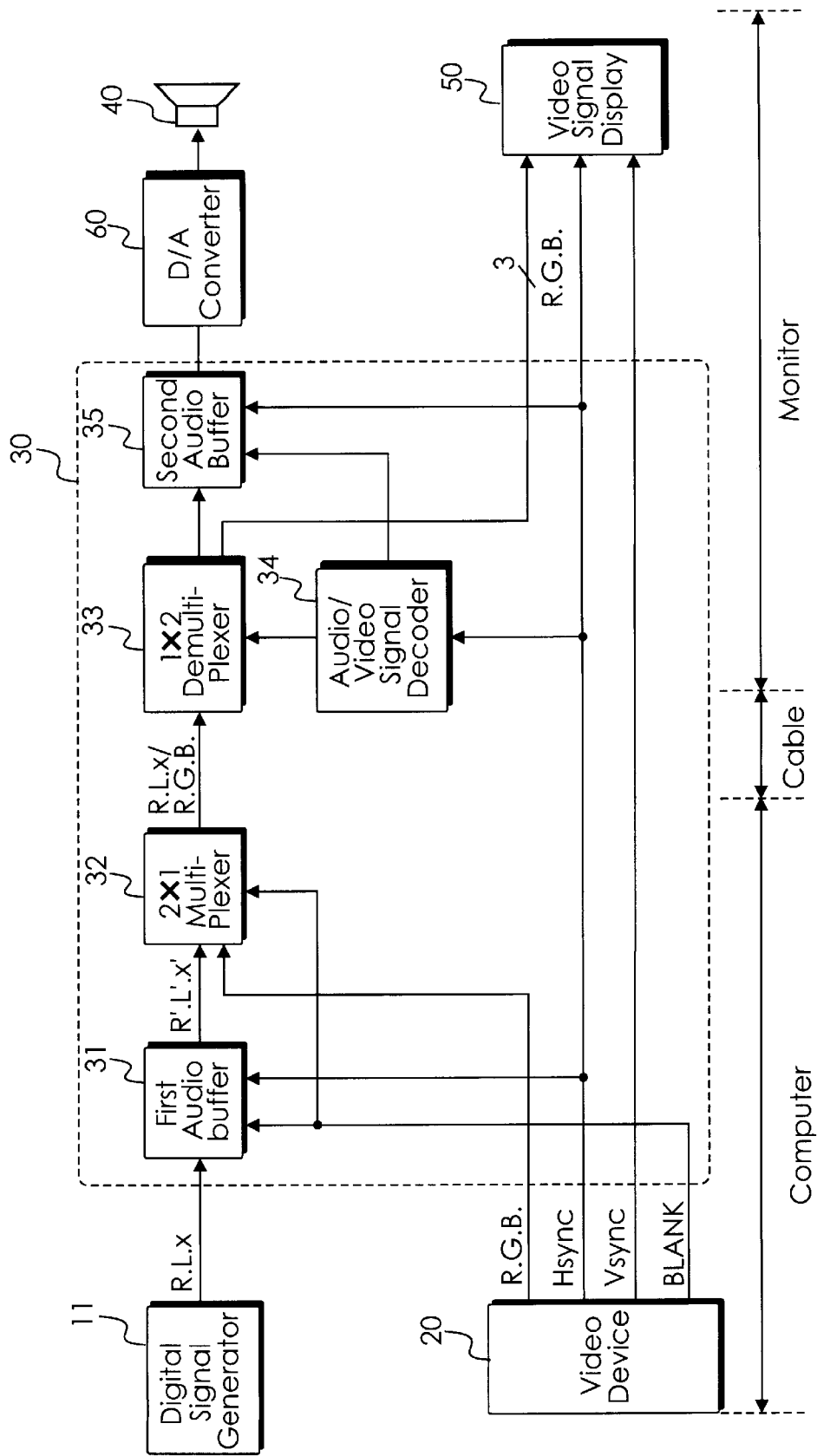
FIG. 6 is a schematic block diagram of a data transmission apparatus for a computer system including a monitor for transmitting an audio signal through a video signal line in accordance with a second embodiment of the present invention.

Refer now to FIG. 6 which illustrates a data transmission apparatus for a computer system including a monitor for transmitting an audio signal through a video signal line in accordance with a second embodiment of the present invention. As shown in FIG. 6, a data transmission apparatus constructed according to the second embodiment includes similar circuit components of the first embodiment shown in FIG. 4, except for the fact that it is intended as a digital system. The audio device 10 of the first embodiment of the present invention is replaced with a digital signal generator 11, and a digital-to-analog (A/D) converter 60 is used to convert the output digital audio signal into an analog form for sound generation. Again, the data transmission apparatus of FIG. 6 also includes a video device 20 such as a video card for generating a video signal including red (R), green (G) and blue (B) video components and for activating a blank interval when the red (R), green (G) and blue (B) video components, horizontal synchronization and vertical synchronization signals are not generated. A signal division output device 30 comprising the first audio buffer 31, the 2×1 multiplexer 32, the 1×2 demultiplexer 33, the audio/video signal decoder 34 and the second audio buffer 35, is connected to the digital signal generator 11 and the video device 20 for outputting the video signal when the blank interval is not activated, and alternately outputting the audio signal when the blank interval is activated. A video signal display 50 is connected to the signal division output device 30 for processing and scanning on a screen the video signal output from the signal division output device 30. An audio signal output device 40 such as a speaker is also connected to the signal division output device 30 through the D/A converter 60 for processing and generating audible sound corresponding to the audio signal output from the signal division output device 30.

In the first embodiment of the present invention as shown in FIG. 4, an analog audio signal is output from the signal division output device 30 to the audio signal output device 4 through the video signal line. In the second embodiment of the present invention as shown in FIG. 6 however, a digital audio signal is output from the signal division output device 30 to the audio signal output device 40 through the video signal line. The digital audio signal output from the digital signal generator 11 is input into the signal division output device 30, and the operation of the signal division output device 30 of FIG. 6 is identical to that of FIG. 4. Therefore, the digital audio signal is output through the video signal line when the blank signal is activated, and the analog video signal is output when the blank signal is not activated.

The digital audio signal as described above is converted into an analog audio signal through the D/A converter 6 and is then output to the audio signal output device 40. In a computer system using a VGA color monitor according to the principles of the present invention, since the audio signal is transmitted through the R, G, B video signal line, the audio signal is transmitted to the monitor without a separate cable. Accordingly, data is transmitted with high confidence because the audio signal is first converted into digital data for transmission, and the data transmission apparatus constructed according to the principles of the present invention advantageously provides high quality sound transmission with less noise.

While there have been illustrated and described what are considered to be preferred embodiments of the present invention, it will be understood by those skilled in the art that various changes and modifications may be made, and equivalents may be substituted for elements thereof without departing from the true scope of the present invention. For instance, both the audio signal and the video signal may be transmitted through a video signal line in digital format. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A data transmission apparatus for transmitting an audio signal through a video signal cable, comprising:

a monitor including a sound speaker and a video display;

a computer system comprising:

audio generating means for generating an audio signal;

video generating means for generating a video signal and synchronization signals, first audio buffer means for temporarily retaining the audio signal and outputting the audio signal during a blanking interval of the video signal in accordance with the synchronization signals; and multiplexer means for multiplexing the audio signal with the video signal by inserting the audio signal into the blanking interval of the video signal, and for generating a multiplexed signal;

a video signal cable configuration comprising a plurality of leads connected between the computer system and the monitor, for transmitting the synchronization signals between the computer system and the monitor on at least one lead and separately transmitting on a different lead the multiplexed signal from the computer system to the monitor; and said monitor comprising:

demultiplexer means connected to said video signal cable, for demultiplexing the multiplexed signal received from said video signal cable by separating the audio signal and the video signal from the multiplexed signal in accordance with a control signal, and for generating a separated audio signal and a separated video signal;

second audio buffer means for temporarily retaining the separated audio signal and outputting the separated audio signal to said sound speaker for sound production in accordance with the control signal and the synchronization signals; and said video display connectable to receive the synchronization signals, said video display enabling a visual display of the separated video signal on a screen in accordance with the synchronization signals.

2. The data transmission apparatus of claim 1, further comprised of said first buffer means temporarily retaining the audio signal for time axis adjustment.

3. The data transmission apparatus of claim 1, further comprised of said second buffer means temporarily retaining the separated audio signal for time axis adjustment.

4. The data transmission apparatus of claim 1, further comprised of the audio signal and the video signal representing analog signals respectively.

5. The data transmission apparatus of claim 1, further comprised of the audio signal and the video signals representing digital signals respectively.

6. The data transmission apparatus of claim 1, further comprised of said monitor comprising decoder means connected to the video signal cable for generating said control signal in accordance with the synchronization signals.

7. The data transmission apparatus of claim 1, further comprised of said audio generating means corresponding one of a sound card and a compact disk read-only-memory for generating said audio signal.

8. The data transmission apparatus of claim 7, further comprised of said video generating means corresponding a video card for generating said video signal.

9. The data transmission apparatus of claim 8, further comprised of said monitor comprising decoder means connected to the video signal cable for generating said control signal in accordance with the synchronization signals.

10. A method for transmitting an audio signal through a video signal cable connected between a computer system and a monitor including a sound speaker, said method comprising the steps of:

receiving an audio signal from a sound card;

receiving synchronization signals and a video signal from a video card;

multiplexing the audio signal with the video signal by inserting the audio signal into a blanking interval of the video signal in dependence upon the synchronization signals, to generate a multiplexed signal through said video signal cable connected between the computer system and the monitor;

transmitting synchronization signals between the computer system and the monitor on at least one lead of said video signal cable, and separative transmitting on a different lead of said video signal cable the multiplexed signal from the computer system to the monitor;

receiving the multiplexed signal from said video signal cable containing the audio signal and the video signal;

demultiplexing the multiplexed signal received from said video signal cable by separating the audio signal and the video signal from the multiplexed signal in dependence upon said synchronization signals, to generate a separated audio signal and a separated video signal;

generating audio sound production corresponding to the separated audio signal through said sound speaker in dependence upon said synchronization signals; and simultaneously with generation of said audio sound production, enabling a visual display of the separated video signal on a screen of the monitor in dependence upon said synchronization signals.

11. The method of claim 10, further temporarily retaining the audio signal for time axis adjustment before the multiplexing with the video signal, and after the demultiplexing of the multiplexed signal.

12. The method of claim 10, further comprised of the audio signal and the video signal representing analog signals respectively.

13. The method of claim 10, further comprised of the audio signal and the video signals representing digital signals respectively.

14. A data transmission apparatus, comprising:

a computer system comprising of:
digital audio generating means for generating digital samples of an audio signal;
video generating means for generating an analog video signal and synchronization signals,
first audio buffer means for temporary retaining the digital samples of the audio signal for time axis adjustment and outputting the digital samples of the audio signal during a blanking interval of the analog video signal in dependence upon the synchronization signals; and
multiplexer means for multiplexing the digital samples of the audio signal with the analog video signal by inserting the digital samples of the audio signal into the blanking interval of the analog video signal, and for generating a multiplexed signal;
a video signal cable configuration comprising a plurality of leads connected between the computer system and a monitor including a sound speaker, for transmitting the synchronization signals between the computer system and the monitor on at least one lead, and separately transmitting on a different lead the multiplexed signal from the computer system to the monitor through a video signal line; and
said monitor comprised of:
demultiplexer means connected to said video signal cable, for demultiplexing the multiplexed signal received from said video signal cable by separating the digital samples of the audio signal and the analog video signal from the multiplexed signal in dependence upon the synchronization signals, and for generating a separated digital audio signal and a separated analog video signal;
second audio buffer means for temporarily retaining the separated digital audio signal and outputting the separated digital audio signal in dependence upon the synchronization signals; and
converter means for converting the separated digital audio signal into an analog audio signal and outputting the analog audio signal through said sound speaker for sound production; and
video display means connectable to receive the synchronization signals, said video display means simultaneously enabling a visual display of the separated analog video signal on a screen in dependence upon the synchronization signals.

15. The data transmission apparatus of claim 14, further comprised of said monitor comprising decoder means connected to the video signal cable for generating a control signal to control the separation of the digital samples of the audio signal and the analog video signal from the multiplexed signal received from the video signal cable in dependence upon the synchronization signals.

16. The data transmission apparatus of claim 14, further comprised of said digital audio generating means comprising one of a digital sound card and a compact disk read-only-memory, generating said digital audio signal.

17. The data transmission apparatus of claim 14, further comprised of said video generating means comprising a video card generating said analog video signal.

18. The data transmission apparatus of claim 14, further comprised of said monitor comprising a decoder connected to the video signal cable and generating a control signal to control the separation of the digital samples of the audio signal and the analog video signal from the multiplexed signal received from the video signal cable into dependence upon the synchronization signals.

19. The data transmission apparatus of claim 14, further comprised of said video signal cable comprising transmission lines for transmitting the synchronization signals from the computer system to the monitor concurrently with the transmission of the multiplexed signal.

* * * * *